US009455089B2

(12) United States Patent
Rofougaran (10) Patent No.: US 9,455,089 B2
(45) Date of Patent: Sep. 27, 2016

(54) LIQUID MEMS CAPACITOR (71) Applicant: Broadcom Corporation, Irvine, CA (US)

(72) Inventor: Ahmadreza Rofougaran, Newport Coast, CA (US)

(73) Assignee: BROADCOM CORPORATION, Irvine, CA (US)

( * ) Notice: Subject to any disclaimer, the term of this patent is extended or adjusted under 35 U.S.C. 154(b) by 302 days.

(21) Appl. No.: 13/665,712

(22) Filed: Oct. 31, 2012

(65) Prior Publication Data

US 2014/0071584 A1 Mar. 13, 2014

Related U.S. Application Data

(60) Provisional application No. 61/699,183, filed on Sep. 10, 2012.

(51) Int. Cl.
| | |
|---|---|
| *H01G 5/012* | (2006.01) |
| *H01G 5/00* | (2006.01) |
| *H01G 7/00* | (2006.01) |
| *H01G 5/013* | (2006.01) |
| *G01F 23/26* | (2006.01) |
| *H01G 5/019* | (2006.01) |
| *H01H 59/00* | (2006.01) |

(52) U.S. Cl.
CPC ............ *H01G 5/0132* (2013.01); *H01G 5/019* (2013.01); *H01G 7/00* (2013.01); *H01H 59/0009* (2013.01)

(58) Field of Classification Search
CPC .. H01G 5/0132; G01F 23/263; G01F 23/268
USPC ................................. 361/287, 284, 277, 285
See application file for complete search history.

(56) References Cited

U.S. PATENT DOCUMENTS

| 7,088,567 B2 | 8/2006 | Hunt et al. |
| 7,242,569 B2 * | 7/2007 | Hunt et al. ..................... 361/277 |
| 2004/0150939 A1 | 8/2004 | Huff |

(Continued)

FOREIGN PATENT DOCUMENTS

| EP | 1214854 A1 | 6/2002 |
| JP | 2011086661 | 4/2011 |

(Continued)

OTHER PUBLICATIONS

European Patent Office; European Search Report; EP Application No. 13004226.0; Nov. 22, 2013; 4 pgs.

(Continued)

*Primary Examiner* — Eric Thomas
*Assistant Examiner* — Arun Ramaswamy
(74) *Attorney, Agent, or Firm* — Garlick & Markison; Bruce E. Stuckman (57) ABSTRACT

A liquid micro-electro-mechanical system (MEMS) capacitor includes a first capacitor plate, a second capacitor plate, a channel, a dielectric doped droplet, and a droplet activating module. The channel is implemented or embedded in one or more layers of a board and the dielectric doped droplet is contained in the channel. The droplet activating module operable to change the dielectric doped droplet with respect to the first and second capacitive plates, which are proximal to the channel and at a distance from each other, thereby changing a dielectric property of the liquid MEMS capacitor.

18 Claims, 9 Drawing Sheets

(56) References Cited

U.S. PATENT DOCUMENTS

| | | |
|---|---|---|
| 2007/0042802 A1 | 2/2007 | Park et al. |
| 2008/0089005 A1* | 4/2008 | Choi .............. H01G 5/0132 361/278 |
| 2008/0218932 A1* | 9/2008 | Berlin et al. .............. 361/271 |
| 2009/0085427 A1 | 4/2009 | Borno |
| 2012/0094623 A1 | 4/2012 | Khlat |

FOREIGN PATENT DOCUMENTS

| | | |
|---|---|---|
| JP | 4855508 B2 | 1/2012 |
| WO | 2006054006 A2 | 5/2006 |

OTHER PUBLICATIONS

Traille et al.; A Wireless Passive RCS-Based Temperature Sensor Using Liquid Metal and Microfluidics Technologies; Oct. 10, 2011; pp. 45-48; 2011 41st European Microwave Conference.

Sen et al.; A Liquid-Solid Direct Contact Low-Loss RF Micro Switch; IEEE Journal of Microelectromechanical Systems; Oct. 1, 2009; pp. 990-997; vol. 18, No. 5.

Sen et al.; Electrostatic Fringe-Field Actuation for Liquid-Metal Droplets; Jun. 5, 2005; pp. 705-708; vol. 1, No. 5; 13th International Conference on Solid-State Sensors, Actuators and Microsystems.

Latorre et al.; Electrostatic Actuation of Microscale Liquid-Metal Droplets; Journal of Microelectromechanical Systems; Aug. 1, 2002; pp. 302-308; vol. 11, No. 4.

European Patent Office; European Search Report; EP Application No. 13004236.9; Nov. 22, 2013; 4 pgs.

Simon et al., "A Liquid-Filled Microrelay with a Moving Mercury Microdrop," Journal of Microelectromechanical Systems, vol. 6, No. 3, Sep. 1997; 9 pgs.

Sen, P.; Chang-Jin Kim, "A Liquid-Metal RF MEMS Switch with DC-to-40 GHz Performance," Micro Electro Mechanical Systems, 2009. MEMS 2009. IEEE 22nd International Conference on, pp. 904-907, Jan. 25-29, 2009; 4 pgs.

Kondoh et al., "High-Reliability, High-Performance RF Micromachined Switch Using Liquid Metal," Journal of Microelectromechanical Systems, vol. 14, No. Apr. 2, 2005; 7 pgs.

Chung-Hao Chen; Peroulis, D., "Liquid RF MEMS Wideband Reflective and Absorptive Switches," Microwave Theory and Techniques, IEEE Transactions on, vol. 55, No. 12, pp. 2919-2929, Dec. 2007; 11 pgs.

Varadan, V. K., Vinoy, K.J. and Jose, K.A., "Microelectromechanical Systems (MEMS) and Radio Frequency MEMS, in RF MEMS and Their Applications," John Wiley & Sons, Ltd, Chichester, UK; pp. 1-49, May 2003; 49 pgs.

Kim et al.; A micromechanical switch with electrostatically driven liquid-metal droplet; Sensors and Actuators A: Physical; 97-98; Apr. 1, 2002; pp. 672-679; vols. 97-98, Elsevier B.V.

European Patent Office; Partial European Search Report; EP Application No. 13004224; Oct. 7, 2015; 5 pgs.

* cited by examiner

LIQUID MEMS CAPACITOR

CROSS REFERENCE TO RELATED

The present U.S. Utility Patent Application claims priority pursuant to 35 U.S.C. §119(e) to U.S. Provisional Application No. 61/699,183, entitled "Liquid Micro Electro Mechanical Systems (MEMS) Devices and Applications," filed Sep. 10, 2012, pending, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to radio communications and more particularly to liquid MEMS magnetic components that may be used in wireless communication devices.

2. Description of Related Art

Radio frequency (RF) communication devices are known to facilitate wireless communications in one or more frequency bands in accordance with one or more wireless communication protocols or standards. To accommodate multiple communication protocols, or standards, an RF communication device includes multiple versions (one for each protocol) of each section of the RF communication device (e.g., baseband processing, RF receiver, RF transmitter, antenna interface) and/or includes programmable sections. For example, an RF communication device may include a programmable baseband section, multiple RF receiver sections, multiple RF transmitter sections, and a programmable antenna interface.

To provide at least some of the programmable capabilities of a programmable section of an RF communication device, the section includes one or more programmable circuits, wherein the programmability is achieved via a switch-based bank of circuit elements (e.g., capacitors, inductors, resistors). For instance, selecting various combinations of a switch-based bank of capacitors and switch-based bank of inductors yields various resonant tank circuits that can be used in filters, as loads in amplifiers, etc. A recent advance in RF technology is to use integrated circuit (IC) micro-electro-mechanical system (MEMS) switches to provide the switches of a switch-based bank of circuit elements.

Issues with IC MEMS switches include minimal contact areas (which creates heat spots), bouncing of electrical contact (which limits use to cold switching), and a limited life cycle. In response to these issues, more recent advances in RF technology employ IC implemented liquid RF MEMS switches (which may also be referred to as electro-chemical wetting switches). As IC fabrication technologies continue to evolve and reduce the size of IC dies and components fabricated thereon, IC implemented liquid RF MEMS switches may have limited applications.

DETAILED DESCRIPTION OF THE INVENTION

Figure 1:
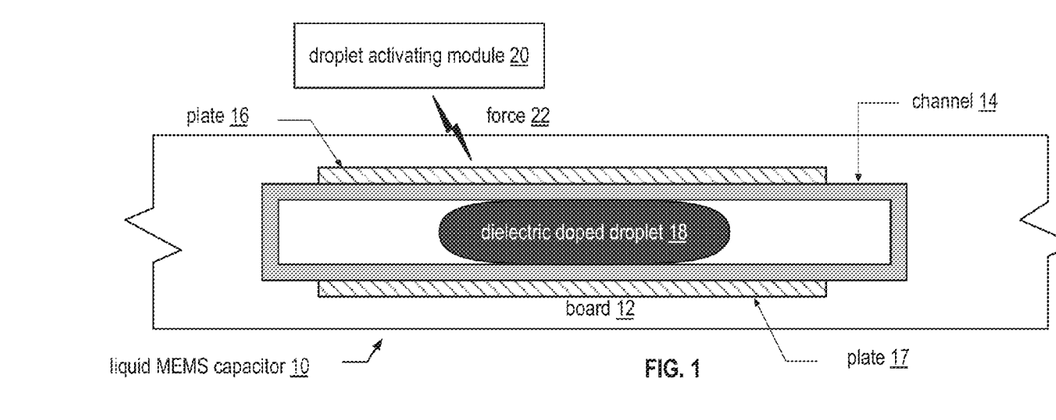
FIGS. 1 and 2 are schematic block diagrams of an embodiment of a liquid MEMS capacitor in accordance with the present invention.
Figure 2:
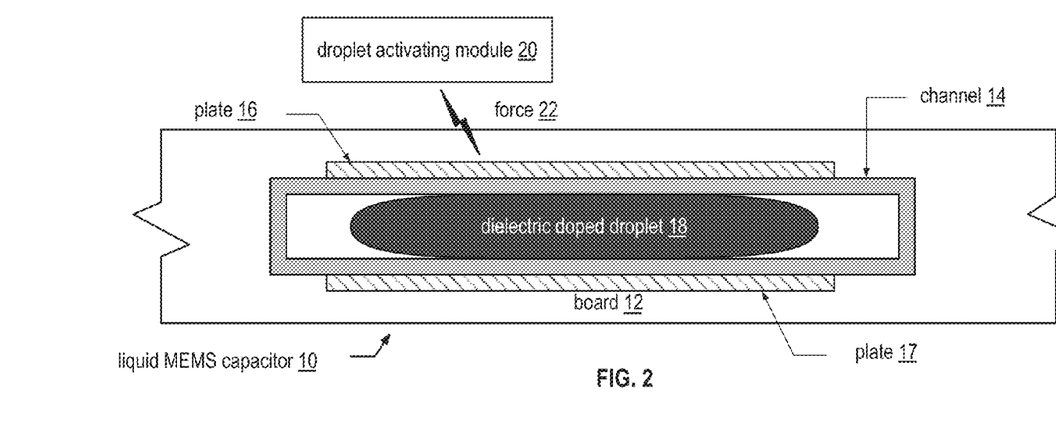

FIGS. 1 and 2 are schematic block diagrams of an embodiment of a liquid MEMS capacitor 10 that may be used in a wireless communication device. A wireless communication device may be a portable computing communication device may be any device that can be carried by a person, can be at least partially powered by a battery, includes a radio transceiver (e.g., radio frequency (RF) and/or millimeter wave (MMW)) and performs one or more software applications. For example, the portable computing communication device may be a cellular telephone, a laptop computer, a personal digital assistant, a video game console, a video game player, a personal entertainment unit, a tablet computer, etc.

As shown, the liquid MEMS capacitor 10 includes a board 12, a channel 14, a first capacitor plate 16, a second capacitor plate 17, a dielectric doped droplet 18, and a droplet activating module 20. The board 12 may be a printed circuit board (PCB), an integrated circuit (IC) package substrate, or a redistribution layer (RDL) of a PCB or of an IC package substrate and it supports the channel 14 in one or more layers. For example, the channel 14 is fabricated in one or more layers of the board 12. As another example, the channel 14 is embedded into one or more layers of the board 12. Note that the channel 14 may have a variety of shapes. For example, the channel 14 may have a square-tubular shape, a cylinder shape, a non-linear square-tubular shape, or a non-linear cylinder shape, where non-linear refers to the axial shape of the channel being something other than a straight line (e.g., a meandering line, an arc, a circle, an ellipse, a polygon, or a portion thereof). In addition, the channel 14 may have its internal and/or external walls coated with an insulating layer, dielectric layer, a semiconductor layer, and/or a conductive layer.

The dielectric doped droplet 18 is contained in the channel 14 and the first and second plates 16 17 are proximally positioned to the channel 16 (e.g., on opposite surfaces of the channel) and are at a distance (d) from each other. As shown in FIG. 1, the droplet activating module 20 applies a first level of force 22 upon the dielectric-doped droplet 18 such that the droplet 18 has a first size and/or shape within the channel 14 and/or a first positioning with respect to the plates 16 17. As shown in FIG. 2, the droplet activating module 20 applies a second level of force 22 upon the dielectric-doped droplet 18 such that the droplet 18 has a second size and/or shape within the channel 14 and/or a second positioning with respect to the plates 16 17. Modifying the dielectric-doped droplet 18 with respect to the first and second plates 16 17 causes a change in a dielectric property (e.g., effective distance, effective area of overlap, permittivity, capacitance, etc.) of the liquid MEMS capacitor 10.

As an example, the dielectric doped droplet 18 is a solution that includes suspending dialectic particles and its shape, size, and/or position changes in the presence of a force 22 (e.g., electric field, magnetic field, compression, actuation, heat, etc.). For example, with a minimal (or inactive) force 22 applied, the droplet 18 is in a contracted shape, which provides a first dielectric property for a liquid MEMS capacitor (i.e., the droplet 18 has the first shape, size, and/or positioning with respect to the plates 16 17). When a sufficiently large (or active) force 22 is applied, the shape, size, and/or position of the droplet 18 change, which changes the dielectric properties of the capacitor. Note that the capacitance of a capacitor is $C=\epsilon_r\epsilon_0(A/d)$, where C is the capacitance, A is the area of overlap of the two plates, $\epsilon_r$ is the relative static permittivity (e.g., dielectric constant) of the material between the plates, $\epsilon_0$ is the electric constant, and d is the distance between the two plates. As such, by changing the dielectric properties, the dielectric constant is changed, which proportionally changes the capacitance of the liquid MEMS capacitor.

Figure 3:
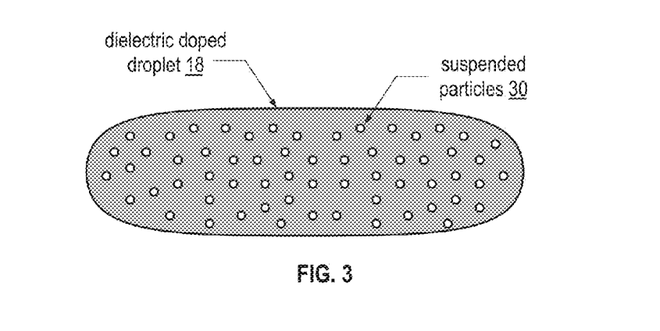
FIG. 3 is a schematic block diagram of an embodiment of a dielectric doped droplet of a liquid MEMS capacitor in accordance with the present invention.

FIG. 3 is a schematic block diagram of an embodiment of a dielectric doped droplet 18 of a liquid MEMS capacitor 10. The dielectric doped droplet 18 includes a non-conductive liquid solution (e.g., magnetically and/or electrically inert liquid, gel, oil, etc.) and a plurality of dielectric particles 30 suspending in the liquid solution. The particles 30 may be porcelain, glass, and/or plastic particles. Note that the non-conductive liquid solution has a density that enables suspension of the particles 30. Further note that the particles 30 may be coated with a material to reduce their individual densities. Alternatively, the dielectric doped droplet 18 may be a liquid colloid of the non-conductive liquid solution and the particles 30 or a hydrocolloid that includes the particles 30. Note that the non-conductive liquid solution may expand, contract, change its shape, and/or changes its position in the channel in response to the force 22 applied by the droplet activating module 20.

Figure 4:
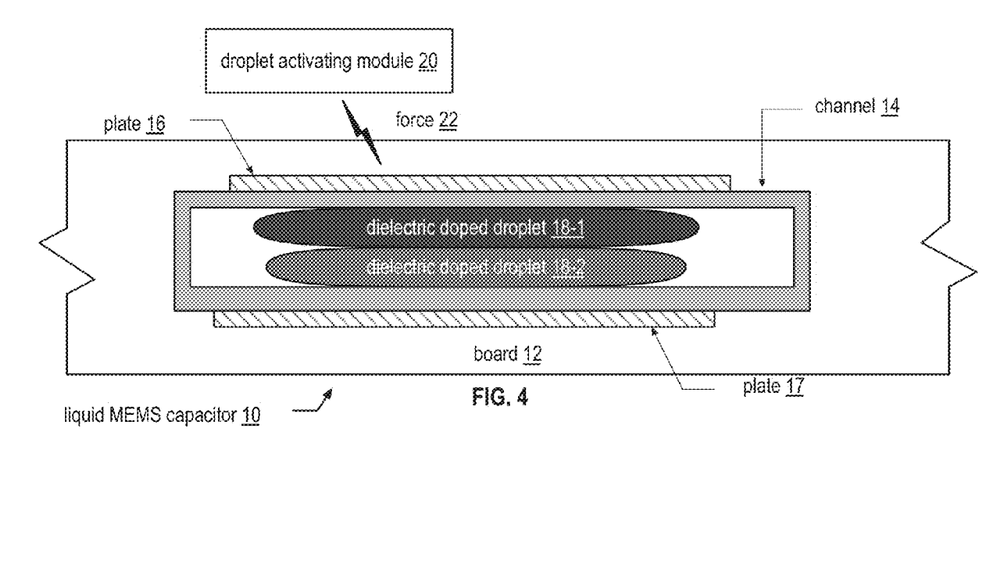
FIG. 4 is a schematic block diagram of another embodiment of a liquid MEMS capacitor having multiple dielectric doped droplets in accordance with the present invention.

FIG. 4 is a schematic block diagram of another embodiment of a liquid MEMS capacitor 10 having multiple dielectric doped droplets 18-1 18-2, and the droplet activating module 20. In this embodiment, the dielectric-doped droplet 18-1 has first dielectric properties (e.g., a first variable permittivity based on a first concentration, size, material, etc. of the particles in droplet 18-1) and the second dielectric-doped droplet 18-2 has second dielectric properties (e.g., a second variable permittivity based on a second concentration, size, material, etc. of the particles in droplet 18-2). Since each droplet has a different permittivity, they affect the dielectric properties of the liquid MEMS capacitor 10 differently as the force 22 changes.

To further enhance the difference between the droplets, the liquid solution of each droplet 18-1 18-2 may be different such that they react differently to the force 22. For example, the liquid solution of droplet 18-1 has a first density and the liquid solution of droplet 18-2 has a second density such that each reacts differently to an applied force (e.g., compression, heat, actuator, etc.).

While the droplets 18-1 and 18-2 are shown to be stacked in the channel 14, they may have a different orientation with respect to one another. For example, the droplets 18-1 and 18-2 may be side-by-side as opposed to stacked. As another example, a barrier physically separates the droplets 18-1 and 18-2 such that the droplets remain side-by-side or stacked. As yet another example, the densities of the droplets 18-1 and 18-2 are different to maintain a physical separation.

Figure 5:
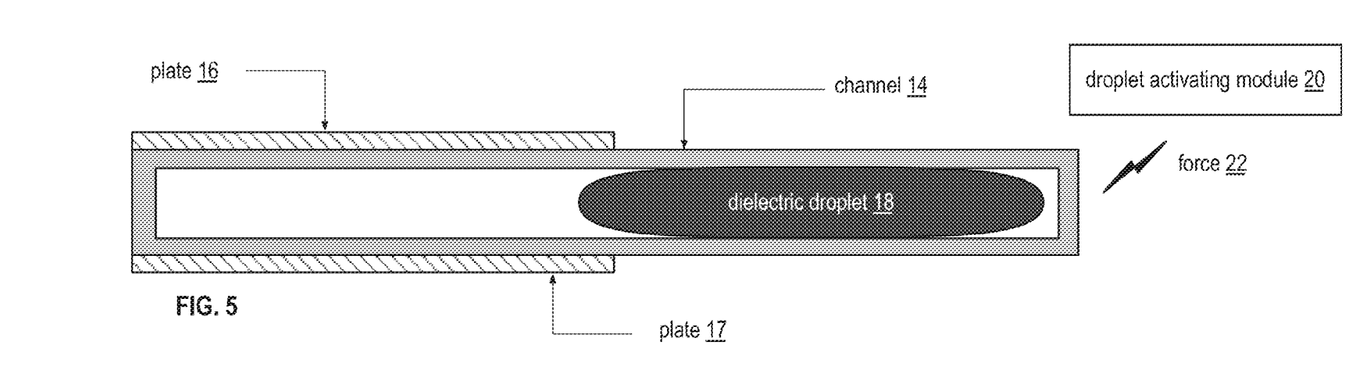
FIGS. 5 and 6 are schematic block diagrams of another embodiment of a liquid MEMS capacitor in accordance with the present invention.
Figure 6:
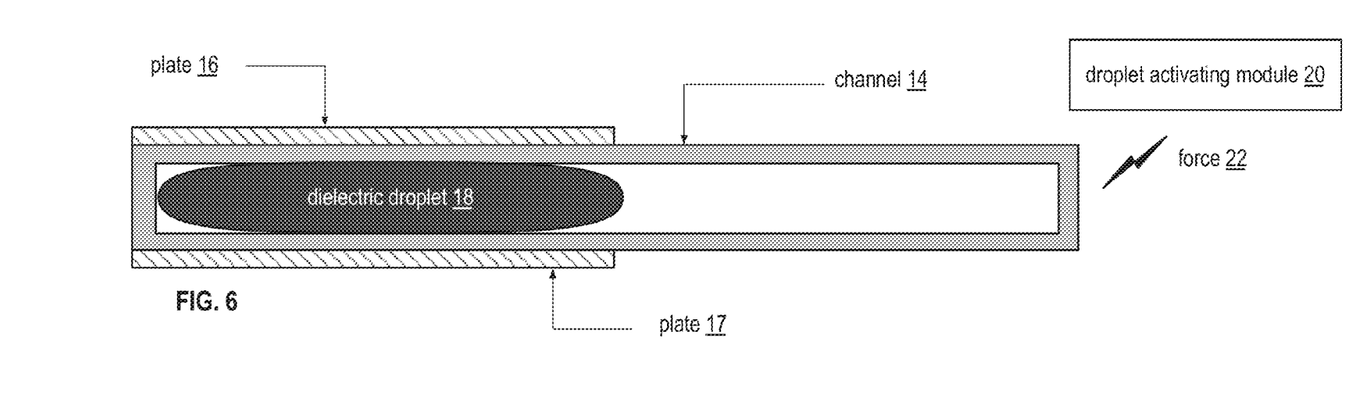

FIGS. 5 and 6 are schematic block diagrams of another embodiment of a liquid MEMS capacitor 10 that includes a channel 14, a droplet 18, a first plate 16, a second plate 17, and a droplet activating module 20. The droplet activating module 20 may generate an electric field force, a magnetic field force, a pressure force, an actuator force, and/or a heat force 22 to move the position of the droplet 18 with respect to the plates 16 and 17. As the position of the droplet 18 changes with respect to the plates 16 and 17, the relative permittivity of capacitor 10 changes, which changes one or more properties of the capacitor (e.g., changes capacitance, frequency range, bandwidth, etc.).

As shown in FIG. 5, the position of the droplet 18 is substantially outside the area in the channel 14 between the plates 16 and 17. In this instance, the permittivity of the capacitor corresponds to the permittivity of air or the permittivity of a gas that is contained in the channel 14. As shown in the FIG. 6, the position of the droplet 18 is substantially within the area in the channel 14 between the plates 16 and 17. In this instance, the permittivity of the capacitor substantially corresponds to the permittivity of the droplet 18. As the force 22 is varied, the position of the droplet 18 may range between its positions of FIGS. 5 and 6.

Figure 7:
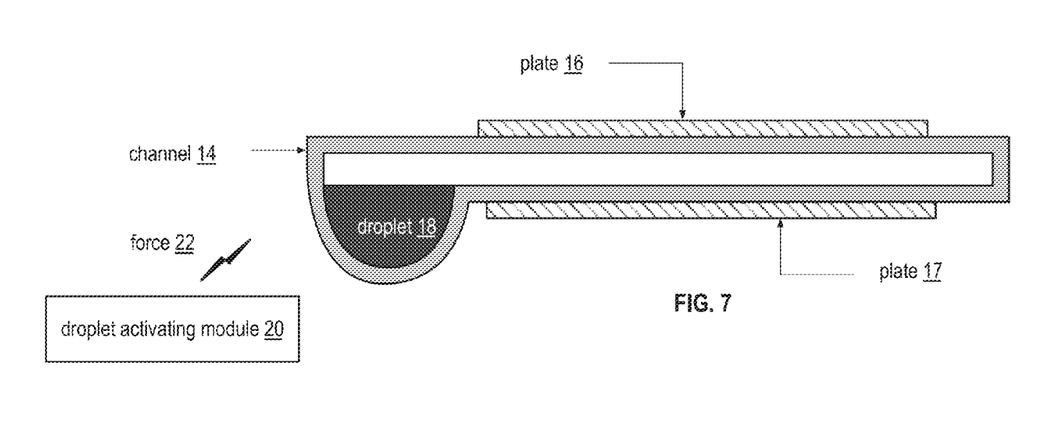
FIGS. 7 and 8 are schematic block diagrams of another embodiment of a liquid MEMS capacitor in accordance with the present invention.
Figure 8:
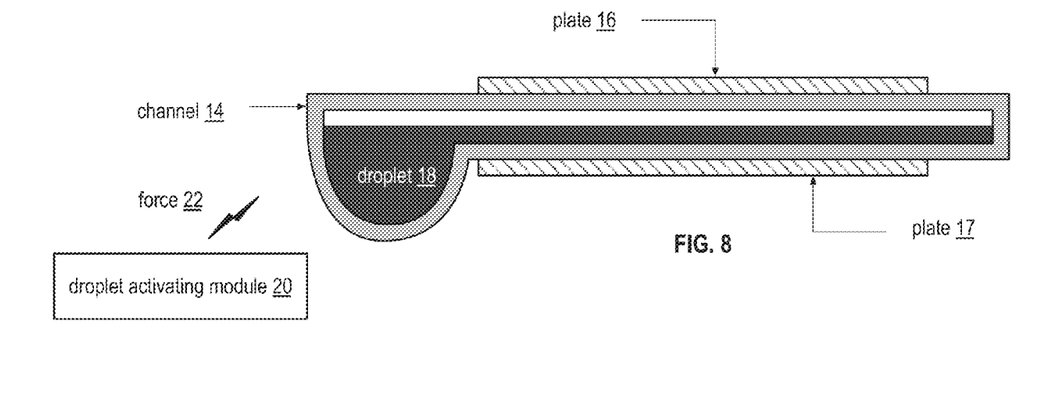

FIGS. 7 and 8 are schematic block diagrams of another embodiment of a liquid MEMS capacitor 10 that includes a channel 14, a droplet 18, a winding 16, and a droplet activating module 20. The droplet activating module 20 generates an electric field force, a magnetic field force, a pressure force, an actuator force, or a heat force 22 that expands or pushes the droplet 18 into the channel 14, which includes a reservoir for holding the droplet 18. As the droplet 18 extends into the channel 14, it changes the relative permittivity of the capacitor, which changes one or more properties of the capacitor (e.g., changes capacitance, frequency range, bandwidth, etc.).

Figure 9:
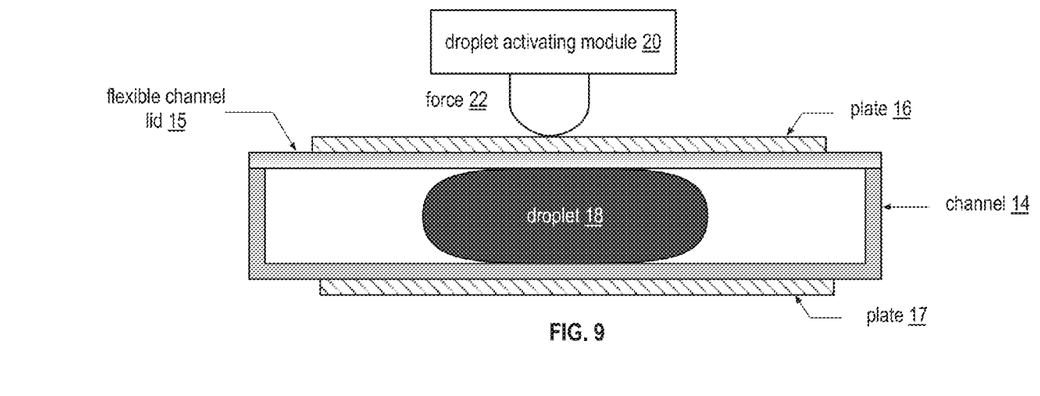
FIGS. 9 and 10 are schematic block diagrams of another embodiment of a liquid MEMS capacitor in accordance with the present invention.
Figure 10:
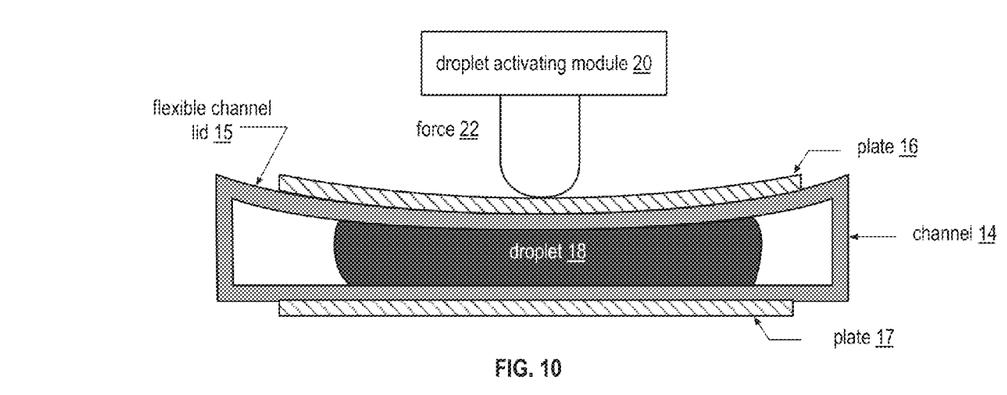

FIGS. 9 and 10 are schematic block diagrams of another embodiment of a liquid MEMS capacitor 10 that includes a channel 14 (which includes a flexible lid 15), a droplet 18, a first plate 16 (which may be flexible), a second plate 17, and a droplet activating module 20. The droplet activating module 20 generates a pressure force 22 or an actuator force 22 that presses on the flexible lid 15 of the channel 14, which changes the shape of the droplet 18. As the droplet 18 changes shape in response to the force 22, the permittivity of the capacitor is changed, which changes one or more properties of the capacitor (e.g., changes capacitance, frequency range, bandwidth, etc.).

Figure 11:
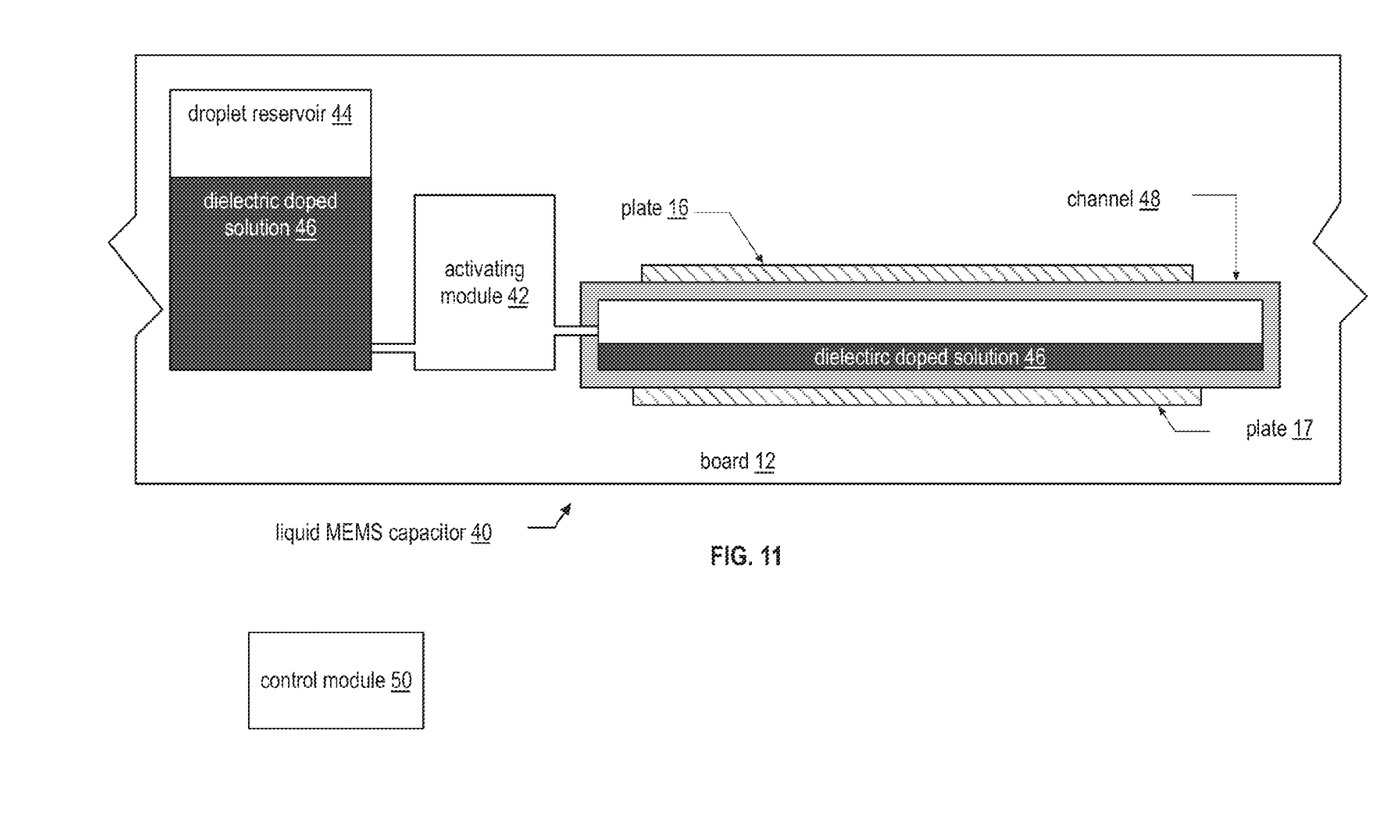
FIG. 11 is a schematic block diagram of another embodiment of a liquid MEMS capacitor in accordance with the present invention.

FIG. 11 is a schematic block diagram of another embodiment of a liquid MEMS capacitor 40 that includes a board 12, a first plate 16, a second plate 17, an activating module 42, a droplet reservoir 44, a dielectric doped solution 46, and a channel 48. The dielectric-doped solution 46, which is contained in the reservoir 44, includes a colloid of a plurality of dielectric particles and a non-conductive liquid solution and/or a plurality of dielectric particles suspended in a non-conductive liquid solution. The channel 48 may have a four-sided tubular shape, where the first capacitor plate 16 is on a first wall of the channel and the second capacitor plate 17 is on a first opposite wall of the channel 48. In addition, the channel 48 includes an insulator on a second wall and a second opposite wall, where the first wall and the first opposite wall are substantially parallel to each other and the second wall is approximately perpendicular to the first wall and is substantially parallel to the second opposite wall.

In an example of operation, the control module 50 generates a control signal, which is provided to the activating module 42. In response, the activating module 42, which may be an actuator or pump, injects the dielectric-doped solution 46 from the reservoir 44 into a least a portion of the channel 48. For example, the activating module 42 may inject, or pump, the dielectric-doped solution 46 into the channel 48 to partially fill it or to fully fill it. As the droplet 18 fills the channel 48, it changes the permittivity of the capacitor, which changes one or more properties of the capacitor (e.g., changes capacitance, frequency range, bandwidth, etc.).

Figure 12:
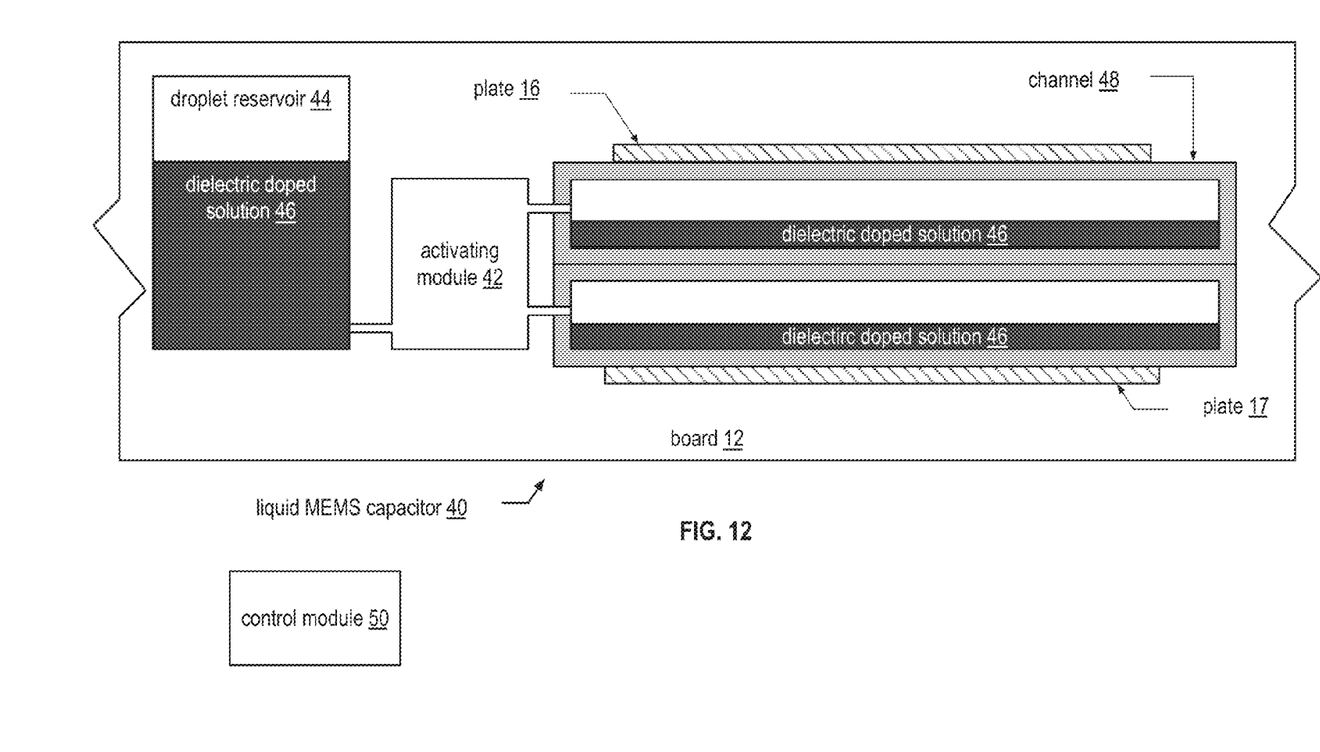
FIG. 12 is a schematic block diagram of another embodiment of a liquid MEMS capacitor in accordance with the present invention.

FIG. 12 is a schematic block diagram of another embodiment of a liquid MEMS capacitor 40 that includes a board 12, a first plate 16, a second plate 17, an activating module 42, a droplet reservoir 44, a dielectric doped solution 46, and a plurality of channels 48. The dielectric-doped solution 46, which is contained in the reservoir 44, includes a colloid of a plurality of dielectric particles and a non-conductive liquid solution and/or a plurality of dielectric particles suspended in a non-conductive liquid solution.

In an example of operation, the control module 50 generates a control signal, which is provided to the activating module. In response, the activating module 42, which may be an actuator or pump, injects the dielectric-doped solution 46 from the reservoir 44 into a least a portion of one or more channels 48. For example, the activating module 42 may inject, or pump, the dielectric-doped solution 46 into one channel 48 to partially fill it or to fully fill it. As another example, the activating module 42 may inject, or pump, the dielectric-doped solution 46 into two channels 48 to partially fill each, to fully fill each, or to partially fill one and fully fill the other. As the droplet 18 fills one or more channels, it changes the permittivity of the capacitor, which changes one or more properties of the capacitor (e.g., changes capacitance, frequency range, bandwidth, etc.).

Figure 13:
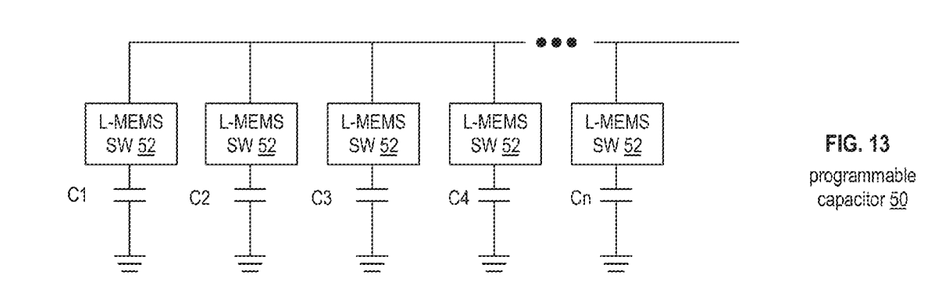
FIG. 13 is a schematic block diagram of another embodiment of a programmable capacitor that includes liquid MEMS switches in accordance with the present invention.

FIG. 13 is a schematic block diagram of another embodiment of a programmable capacitor 50 that includes a plurality of capacitors (C1-Cn) and liquid MEMS switches 52. In an implementation, one or more of the capacitors may be implemented on the board 12 with the liquid MEMS switches 52 and remaining capacitors may be implemented on-chip with a control module and/or other circuitry of a wireless communication device. In an example of operation, one or more of the liquid MEMS switches 52 is activated to couple one or more of the capacitors in parallel with one or more other capacitors. An example of the liquid MEMS switch 52 is further discussed with reference to FIGS. 15 and 16.

Figure 14:
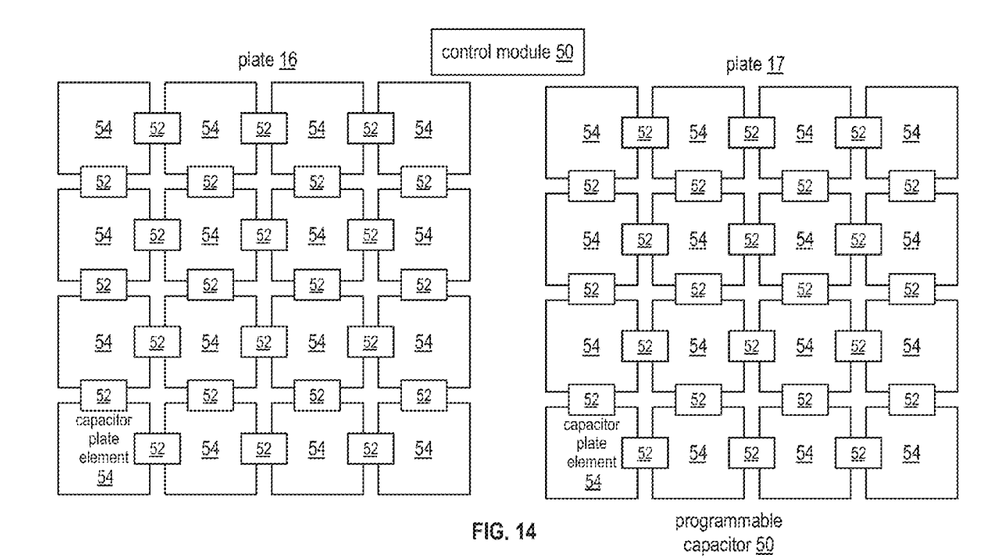
FIG. 14 is a schematic block diagram of another embodiment of a programmable capacitor that includes liquid MEMS switches in accordance with the present invention.

FIG. 14 is a schematic block diagram of another embodiment of a programmable capacitor 50 that includes a first plate 16 and a second plate 17. Each of the first and second plates 16 and 17 includes a plurality of plate segments 54 and a plurality of liquid MEMS switches 52. In an implementation, one or more of the plate segments 54 may be implemented on the board 12 with the liquid MEMS switches 52 and remaining plate segments may be implemented on-chip.

In an example of operation, one or more of the liquid MEMS switches 52 is activated, in response to a control signal from the control module 50, to couple one or more of the plate segments 54 in series and/or in parallel with one or more other plate segments 54 to produce one of the first and second plates 17. In this manner, the plate elements 54 are coupled together to produce a desired shape, a desired thickness, a desired number of turns, and/or a desired length of each of the plates 16 and 17.

Figure 15:
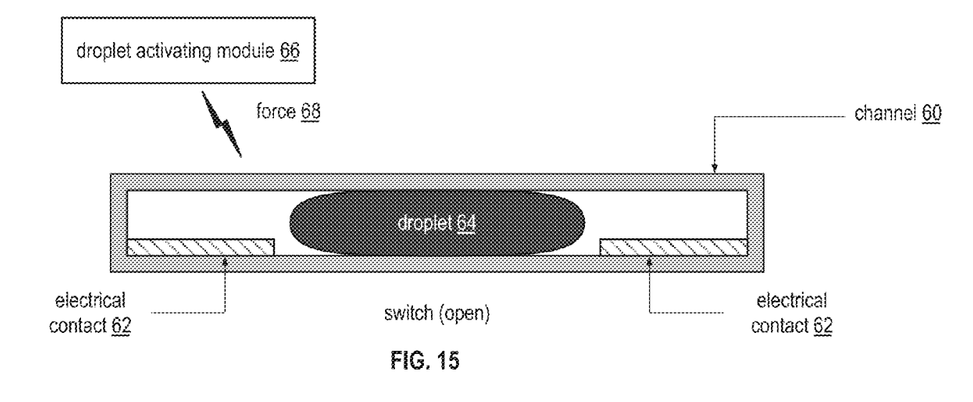
FIGS. 15 and 16 are schematic block diagrams of another embodiment of a liquid MEMS capacitor in accordance with the present invention.
Figure 16:
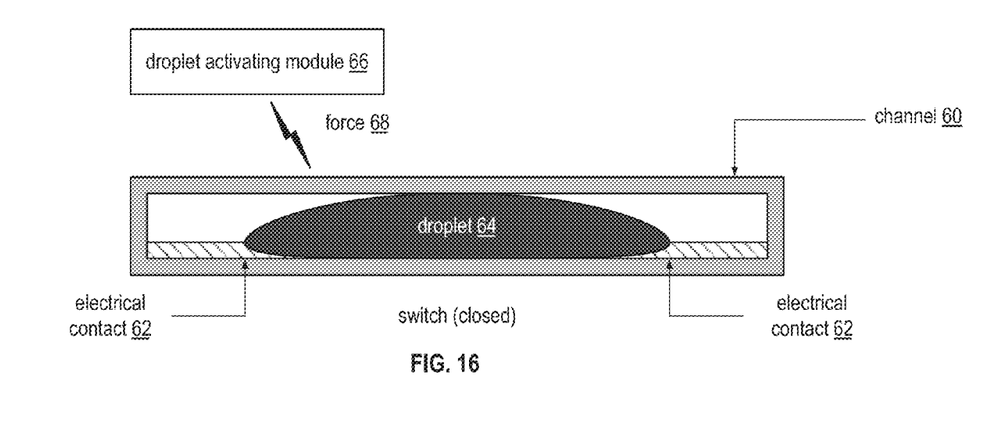

FIGS. 15 and 16 are schematic block diagrams of another embodiment of a liquid MEMS capacitor 52 that includes a channel 60, a droplet 64, electrical contact 62, and a droplet activating module 66. The droplet 64 is electrically conductive and its shape changes in the presence of a force 68 (electric and/or magnetic field, heat, compression, actuation, etc.). With a minimal force 68 applied by the droplet activating module 66, the droplet 64 is not in contact with one or more of the electrical contracts 62 as shown in FIG. 15. As such the switch is open. When a sufficiently large (or active) force 68 is applied by the droplet activating module 66, the shape of the droplet 64 changes causing it to make contact with the electrical contracts 62 as shown in FIG. 16. As such, the switch is closed.

While the liquid MEMS capacitor 10 has been discussed as being implemented on a board 16, it could be implemented on an integrated circuit (IC) die. A liquid MEMS capacitor 10 implemented on a board versus an IC die may be tens, hundreds, or thousands of times larger allowing for larger capacitors to be implemented on a board versus the IC die. Nevertheless, there may be certain applications where implementing the liquid MEMS capacitor on one or more IC dies is more desirable than implementing the capacitor on a board.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A liquid micro-electro-mechanical system (MEMS) capacitor comprises:
   a first capacitor plate;
   a second capacitor plate;
   a channel in one or more layers of a board configured to contain a first dielectric doped droplet and a second dielectric doped droplet that is physically separate from the first dielectric doped droplet, wherein the first dielectric doped droplet has first dielectric properties and the second dielectric doped droplet has second dielectric properties, and wherein the first and second capacitor plates are proximal to the channel and at a distance from each other; and
   a droplet activating module operable to change the first dielectric doped and the second dielectric doped droplet with respect to the first and second capacitive plates thereby changing a dielectric property of the liquid MEMS capacitor, wherein the first dielectric doped droplet comprises a plurality of first dielectric particles suspended in a non-conductive liquid solution, wherein the non-conductive liquid solution expands in response to a stimulus from the droplet activating module, and wherein the second dielectric doped droplet comprises a plurality of second dielectric particles suspended in a non-conductive liquid solution, wherein the non-conductive liquid solution expands in response to a stimulus from the droplet activating module, and wherein the second dielectric particles have at least one of: a size that differs from the first dielectric particles, a concentration that differs from the first dielectric particles, or a material that differs from the first dielectric particles.

2. The liquid MEMS capacitor of claim 1 wherein the droplet activating module is further operable to move the first dielectric doped droplet within the channel to effect the change on the dielectric doped droplet.

3. The liquid MEMS capacitor of claim 1 wherein the board include one of a printed circuit board (PCB), an integrated circuit (IC) package substrate, and a redistribution layer (RDL) of a PCB or of an IC package substrate.

4. The liquid MEMS capacitor of claim 1, wherein the droplet activating module comprises at least one of:
   an actuator;
   an electric field source;
   a magnetic field source;
   a heat source;
   a compression source; and
   an expansion source.

5. The liquid MEMS capacitor of claim 1 wherein the first dielectric doped droplet is stacked in the channel adjacent to the second dielectric doped droplet.

6. A liquid micro-electro-mechanical system (MEMS) capacitor comprises:
   a board having a plurality of channels in multiple layers of the board, wherein a channel of the plurality of channels in one or more of the multiple layers of the board configured to contain a dielectric solution including a first dielectric doped droplet and a second dielectric doped droplet that is physically separate from the first dielectric doped droplet, wherein the first dielectric doped droplet has first dielectric properties and the second dielectric doped droplet has second dielectric properties;
   a first capacitor plate proximal to the plurality of channels;
   a second capacitor plate proximal to the plurality of channels and a distance from the first capacitor plate; and
   an activating module operable to inject at least a portion of the dielectric solution into a least a portion one or more channels of the plurality of channels to change a dielectric property of the liquid MEMS capacitor.

7. The liquid MEMS capacitor of claim 6, wherein the dielectric solution comprises:
   a plurality of dielectric particles suspended in a non-conductive liquid solution.

8. The liquid MEMS capacitor of claim 6 further comprises:
   a control module operable to generate a control signal, wherein the control module sends the control signal to the activating module to regulate injection of the dielectric solution to achieve a desired capacitance of the liquid MEMS capacitor.

9. The liquid MEMS capacitor of claim 6 further comprises:
   the channel having a four-sided tubular shape;
   the first capacitor plate on a first wall of the channel; and
   the second capacitor plate on a first opposite wall of the channel, wherein the first wall and the first opposite wall are substantially parallel with respect to each other.

10. The liquid MEMS capacitor of claim 9 further comprises:
    an insulator on a second wall and a second opposite wall, wherein the second wall is approximately perpendicular to the first wall and is substantially parallel to the second opposite wall.

11. A liquid micro-electro-mechanical system (MEMS) capacitor comprises:
    a first capacitor plate;
    a second capacitor plate;
    a channel in one or more layers of a board configured to contain a first dielectric doped droplet and a second dielectric doped droplet that is physically separate from the first dielectric doped droplet, wherein the first dielectric doped droplet has first dielectric properties and the second dielectric doped droplet has second dielectric properties, and wherein the first and second capacitor plates are proximal to the channel and at a distance from each other; and
    a droplet activating module operable exerts a force on the channel to change the first dielectric doped and the second dielectric doped droplet with respect to the first and second capacitive plates thereby changing a dielectric property of the liquid MEMS capacitor;
    wherein the first dielectric doped droplet comprises a plurality of first dielectric particles suspended in a non-conductive liquid solution, wherein the non-conductive liquid solution expands in response to a stimulus from the droplet activating module, and wherein the second dielectric doped droplet comprises a plurality of second dielectric particles suspended in a non-conductive liquid solution, wherein the non-conductive liquid solution expands in response to a stimulus from the droplet activating module, and wherein the second dielectric particles have at least one of: a size that differs from the first dielectric particles, a concentration that differs from the first dielectric particles, or a material that differs from the first dielectric particles.

12. The liquid MEMS capacitor of claim 11 wherein the droplet activating module is further operable to move the first dielectric doped droplet within the channel to effect the change on the dielectric doped droplet.

13. The liquid MEMS capacitor of claim 11 wherein the board includes one of a printed circuit board (PCB), an integrated circuit (IC) package substrate, and a redistribution layer (RDL) of a PCB or of an IC package substrate.

14. The liquid MEMS capacitor of claim 11, wherein the droplet activating module comprises at least one of:
   an actuator;
   an electric field source;
   a magnetic field source;
   a heat source;
   a compression source; and
   an expansion source.

15. The liquid MEMS capacitor of claim 11 wherein the first dielectric doped droplet is stacked in the channel adjacent to the second dielectric doped droplet.

16. The liquid MEMS capacitor of claim 11 further comprises:
   a control module operable to generate a control signal, wherein the control module sends the control signal to the droplet activating module to regulate injection of the non-conductive liquid solution to achieve a desired capacitance of the liquid MEMS capacitor.

17. The liquid MEMS capacitor of claim 11 further comprises:
   the channel having a four-sided tubular shape;
   the first capacitor plate on a first wall of the channel; and
   the second capacitor plate on a first opposite wall of the channel, wherein the first wall and the first opposite wall are substantially parallel with respect to each other.

18. The liquid MEMS capacitor of claim 17 further comprises:
   an insulator on a second wall and a second opposite wall, wherein the second wall is approximately perpendicular to the first wall and is substantially parallel to the second opposite wall.

* * * * *